US012472161B2

(12) United States Patent
Brunner et al.

(10) Patent No.: US 12,472,161 B2
(45) Date of Patent: *Nov. 18, 2025

(54) STORAGE STABLE MIXTURES, METHOD OF IMPROVING RETENTION OF A COMPOUND AND USE OF RICE HULLS AND/OR RICE BRAN TO ENHANCE RETENTION OF A COMPOUND

(71) Applicant: DSM IP ASSETS B.V., Heerlen (NL)

(72) Inventors: Dominik Josef Brunner, Kaiseraugst (CH); Laure Clasadonte, Kaiseraugst (CH); Martin Reto Gadient, Kaiseraugst (CH); Roland Schuepfer, Kaiseraugst (CH)

(73) Assignee: DSM IP ASSETS B.V. (NL)

( * ) Notice: Subject to any disclaimer, the term of this patent is extended or adjusted under 35 U.S.C. 154(b) by 312 days.

This patent is subject to a terminal disclaimer.

(21) Appl. No.: 16/772,948

(22) PCT Filed: Dec. 17, 2018

(86) PCT No.: PCT/EP2018/085205
§ 371 (c)(1),
(2) Date: Jun. 15, 2020

(87) PCT Pub. No.: WO2019/121515
PCT Pub. Date: Jun. 27, 2019

(65) Prior Publication Data
US 2021/0161849 A1 Jun. 3, 2021

(30) Foreign Application Priority Data
Dec. 18, 2017 (EP) .................................... 17207908

(51) Int. Cl.
| A61K 31/21 | (2006.01) |
| A23K 10/37 | (2016.01) |
| A23K 20/10 | (2016.01) |
| A23K 20/105 | (2016.01) |
| A23K 20/111 | (2016.01) |
| A23K 20/132 | (2016.01) |
| A23K 20/142 | (2016.01) |
| A23K 20/158 | (2016.01) |
| A23K 20/174 | (2016.01) |
| A23K 20/28 | (2016.01) |
| A23K 30/00 | (2016.01) |
| A23K 50/10 | (2016.01) |
| A23L 7/10 | (2016.01) |
| A61K 9/08 | (2006.01) |
| A61K 9/16 | (2006.01) |
| A61K 45/06 | (2006.01) |
| A61K 47/10 | (2017.01) |
| A61K 47/46 | (2006.01) |

(52) U.S. Cl.
CPC .............. *A61K 31/21* (2013.01); *A23K 10/37* (2016.05); *A23K 20/10* (2016.05); *A23K 20/105* (2016.05); *A23K 20/111* (2016.05); *A23K 20/132* (2016.05); *A23K 20/142* (2016.05); *A23K 20/158* (2016.05); *A23K 20/174* (2016.05); *A23K 20/28* (2016.05); *A23K 30/00* (2016.05); *A23K 50/10* (2016.05); *A23L 7/115* (2016.08); *A61K 9/08* (2013.01); *A61K 9/1611* (2013.01); *A61K 9/1617* (2013.01); *A61K 9/1664* (2013.01); *A61K 45/06* (2013.01); *A61K 47/10* (2013.01); *A61K 47/46* (2013.01); *Y02P 60/22* (2015.11); *Y02P 60/87* (2015.11)

(58) Field of Classification Search
None
See application file for complete search history.

(56) References Cited

U.S. PATENT DOCUMENTS

| 6,177,124 | B1 | 1/2001 | Grinschgl et al. | |
| 9,266,814 | B2 * | 2/2016 | Duval | A61K 31/24 |
| 11,013,245 | B2 * | 5/2021 | Brunner | A23K 20/105 |
| 2014/0147529 | A1 | 5/2014 | Duval et al. | |
| 2017/0209522 | A1 | 7/2017 | Haga et al. | |
| 2019/0343149 | A1 * | 11/2019 | Gadient | A23K 20/28 |
| 2021/0392922 | A1 * | 12/2021 | Baati | A23K 20/10 |
| 2022/0053798 | A1 * | 2/2022 | Vidoni | A23K 20/28 |

FOREIGN PATENT DOCUMENTS

| WO | 2012/084629 | | 6/2012 | |
| WO | WO-2018091643 | A1 * | 5/2018 | ........... A23K 20/105 |
| WO | WO-2018149755 | A1 * | 8/2018 | ............. A23K 20/10 |
| WO | WO-2018149756 | A1 * | 8/2018 | ............. A23K 20/10 |
| WO | WO-2020053193 | A1 * | 3/2020 | ........... A23K 20/105 |

OTHER PUBLICATIONS

Lopes et al ("Effect of 3-nitrooxypropanol on methane and hydrogen emissions, methane isotopic signature, and ruminal fermentation in dairy cows", Journal of Dairy Science, vol. 99 (7), Jul. 2016, p. 5335-5344). (Year: 2016).*

A. Romero-Perez et al., "Sustained reduction in methane production from long-term addition of 3-nitrooxypropanol to a beef cattle diet", J. Animal Science, vol. 93, No. 4, pp. 1780-1791, Apr. 1, 2015.

Shahid Iqbal et al, "Antioxidant properties and components of some commercially available varieties of rice bran in Pakistan", Food Chemistry, vol. 93, No. 2, pp. 265-272, Nov. 1, 2005.

Seung-Cheol Lee et al, "Effect of Far-Infrared Radiation on the Antioxidant Activity of Rice Hulls", J. Agricultural and Food Chemistry, US, vol. 51, No. 15, Jul. 1, 2003.

(Continued)

Primary Examiner — Sin J Lee
(74) Attorney, Agent, or Firm — Jed C. Benson

(57) ABSTRACT

The present invention relates to improved formulations of propandiol mononitrate and derivatives thereof as well as to the production of such formulations.

21 Claims, No Drawings

(56) References Cited

OTHER PUBLICATIONS

Adachi et al, "Efficiency of rice bran for removal of organochlorine compounds and benzene from industrial wastewater", J. Agricultural and Food Chemistry, vol. 49, No. 3, pp. 1309-1314 (2001).
BR Appln 202001653, Informe De Búsqueda Sobre Solicitud De Patente De Invención, Dec. 2, 2021.
International Search Report for PCT/EP2018/085205 dated Mar. 29, 2019, 4 pages.
Written Opinion of the ISA for PCT/EP2018/085205 dated Mar. 29, 2019, 6 pages.

* cited by examiner

STORAGE STABLE MIXTURES, METHOD OF IMPROVING RETENTION OF A COMPOUND AND USE OF RICE HULLS AND/OR RICE BRAN TO ENHANCE RETENTION OF A COMPOUND

This application is the U.S. national phase of International Application No. PCT/EP2018/085205 filed Dec. 17, 2018 which designated the U.S. and claims priority to EP Patent Application No. 17207908.9 filed Dec. 18, 2017, the entire contents of each of which are hereby incorporated by reference.

The present invention relates to storage stable mixtures comprising propandiol mononitrate and derivatives thereof as well as to the production and use of such forms.

The temperature of the air surrounding the earth is increasing, a process referred to as global warming. One of the main focuses to reduce this warming effect is to reduce the amount of greenhouse gases emitted into the atmosphere. Greenhouse gases are emitted from several different sources, both natural and artificial; however, the two sources with the most emphasis are the agricultural and fossil fuel industries. Within agriculture, ruminants and in particular cattle are the major contributors to the biogenic methane formation, and it has been estimated that the prevention of methane formation from ruminants would almost stabilize atmospheric methane concentrations.

1,3-Propandiol mononitrate (in the following referred to propandiol mononitrate, respectively PDMN) and derivatives thereof have been reported to be highly efficient in reducing the formation of methane in ruminants without affecting microbial fermentation in a way that would be detrimental to the animal (WO2012/084629).

However, propandiol mononitrate and derivatives thereof have absorbed on been found not to be effectively retained under conventional storage conditions, in particular when absorbed onto standard carrier systems commonly used in the feed industry. Furthermore, it has been found that the incorporation of propandiol mononitrate absorbed on silica into standard feed premixes even further reduces the storage stability thereof. The lack of retention of the active in conventional product forms for the feed industry is, however, highly unwanted as accordingly an appropriate dosage is not possible without undue burden, i.e. sophisticated packaging, analysis of the active content before use or overdosing. Moreover, all these methods add significant additional costs-in-use which are not readily accepted by the end user.

Thus, there is an ongoing need for product forms and methods, which overcome the abovementioned problems by enabling the storage over a period of time without significant losses of the active, i.e. of propandiol mononitrate respectively derivatives thereof.

Surprisingly, it has now been found that the addition of rice hulls (also known as rice husks) and/or rice bran to propandiol mononitrate either in the form of a solution thereof in propyleneglycol or as a powderous formulation of propandiol mononitrate absorbed onto silica, also after incorporation thereof into a mineral premix, significantly increased the retention of propandiol mononitrate.

Thus, the invention relates in a first aspect to a storage stable mixture (I), comprising
(1) a compound of formula (I)

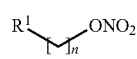

formula (I)

wherein
n is an integer from 1 to 15
$R^1$ is selected from the group consisting of H, $C_1$-$C_6$alkyl, phenyl, —OH, —$NH_2$, —CN, —COOH, —O(C=O)$R^8$, —NHC(=O)$R^8$, $SO_2NHR^8$, and —$ONO_2$, and
$R^8$ is $C_1$-$C_6$alkyl, phenyl, pyridyl such as preferably 2-pyridyl
with the proviso that when n is >3 the hydrocarbon chain may be interrupted by —O— or —NH—, and
(2) rice hulls and/or rice bran.

In all embodiments according to the present invention particularly preferred compounds of formula (I) are compounds wherein n is an integer between 3 and 9 and $R^1$ is OH, COOH or —$ONO_2$ and with the proviso that if n is 4 the hydrocarbon chain may be interrupted by —NH— such as in particular the compounds of formula $R^1$—$(CH_2)_2$—NH—$(CH_2)_2$—$ONO_2$. Even more preferred are compounds of formula (I) wherein n is an integer between 3 and 9 and $R^1$ is OH, COOH or —$ONO_2$.

Even more advantageous compounds of formula (I) according to the present invention are propandiol mononitrate (CAS-No: 100502-66-7), 9-nitrooxynonanol, 5-nitroxy pentanoic acid (CAS 74754-56-6), 6-nitroxy hexanoic acid (CAS 74754-55-5), bis(2-hydroxyethyl)amine dinitrate (CAS 20830-49-3), 1,4-bis-nitrooxybutane (CAS 3457-91-8) and 1,5-bis-nitrooxypentane (CAS 3457-92-9). The most preferred compound of formula (I) to be used according to the present invention is propandiol mononitrate.

In a preferred embodiment, the amount of the compound of formula (I) in the storage stable mixture (I) is at least 0.1 wt.-%, more preferably at least 0.25 wt.-%, most preferably at least 0.5 wt.-%, based on the total weight of the storage stable mixture (I). More preferably, the amount of the compound of formula (I) in the storage stable mixture (I) is selected in the range from 0.1 to 40 wt.-%, most preferably in the range from 0.25 to 25 wt.-%, such as in the range of 0.5 to 20 wt.-%, based on the total weight of the storage stable mixture (I). Further suitable ranges include 0.1 to 10 wt.-%, 0.25 to 10 wt.-%, 0.1 to 5 wt.-% as well as 0.25 to 5 wt.-%.

In a further preferred embodiment, the amount of the rice hulls and/or rice bran (total) in the storage stable mixture (I) is at least 10 wt.-%, more preferably at least 15 wt.-%, most preferably at least 20 wt.-%, based on the total weight of the storage stable mixture (I). More preferably, the amount of the rice hulls and/or rice bran in the storage stable mixture (I) is selected in the range from 10 to 95 wt.-%, most preferably in the range from 15 to 95 wt.-%, such as in the range of 20 to 95 wt.-%, based on the total weight of the storage stable mixture (I).

The term 'storage-stable' as used herein refers to an improved retention of the compound of formula (I) in the mixture according to the present invention compared to the respective mixture without the rice hulls and/or rice bran. Preferably, the retention is improved by at least 10%, more preferably by at least 20%, most preferably by at least 30% compared to the respective mixture without any rice hulls and/or rice bran.

In all embodiments of the present invention, preferably the weight-ratio (w/w) of the rice hulls and/or rice bran (total) to the powderous formulation comprising the compound of formula (I) is at least 1:1, preferably at least 5:1, more preferably at least 10:1, most preferably at least 25:1, such as at least 50:1.

Even more advantageously in all embodiments of the present invention the weight-ratio (w/w) of the rice hulls and/or the rice bran (total) to the powderous formulation comprising the compound of formula (I) is selected in the range of 200:1 to 1:1 (i.e., 200 part of rice hulls and/or rice bran to 1 part of a powderous formulation comprising the compound of formula (I) to 1 parts of rice hulls and/or rice bran to 1 part of a powderous formulation comprising the compound of formula (I)), more preferably in the range of 150:1 to 5:1, most preferably in the range of 100:1 to 25:1. Further suitable ranges are 100:1 to 10:1, 100:1 to 15:1, 100:1 to 30:1 or 100:1 to 35:1.

In one advantageous embodiment, the compound of formula (I) is incorporated into the storage mixture (I) in the form of a solution thereof in an edible solvent.

Thus, the invention also relates to a relates to a storage stable mixture (I) which is a storage stable mixture (1-L) comprising (b1) a liquid formulation ($A_L$) comprising
    (i) a compound of formula (I)

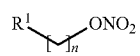

formula (I)

wherein
n is an integer from 1 to 15
$R^1$ is selected from the group consisting of H, $C_1$-$C_6$alkyl, phenyl, —OH, —$NH_2$, —CN, —COOH, —O(C=O)$R^8$, —NHC(=O)$R^8$, $SO_2NHR^8$, and —$ONO_2$, and
$R^8$ is $C_1$-$C_6$alkyl, phenyl, pyridyl such as preferably 2-pyridyl
with the proviso that when n is >3 the hydrocarbon chain may be interrupted by —O— or —NH—, and
    (ii) an edible solvent, and
(b2) rice hulls and/or rice bran.

The term 'liquid formulation' as used herein refers to a formulation which is liquid at ambient temperature (i.e. about 22° C.) (i.e. a solution, wherein the compound of formula (I) is completely solubilized).

The term 'edible solvent' refers to oils commonly used in feed applications and which are suitable to dissolve the compound of formula (I). Preferred edible solvents to be used in the liquid formulations according to the present invention are propyleneglycol, canola oil, corn oil, rapeseed oil, sunflower oil, middle chain triglyceride (MCT), soy bean oil, water and glycerol as well as mixtures thereof. The most preferred edible solvents to be used in the liquid formulation according to the present invention are propylene glycol and water as well as any mixture thereof.

The amount of the compound of formula (I) in the liquid formulation according to the present invention is preferably selected in the range of 1 to 50 wt.-%, more preferably in the range of 5 to 40 wt.-%, most preferably in the range of 10 to 30 wt.-%, such as in the range of 10 to 25 wt.-%, based on the total weight of the liquid formulation.

The amount of the liquid formulation ($A_L$) in the storage stable mixture (1-L) is preferably at least 5 wt.-%, more preferably at least 10 wt.-%, based on the total weight of the storage stable mixture (1-L). More preferably, the amount of the liquid formulation ($A_L$) in the storage stable mixture (1-L) is selected in the range from 5 to 85 wt.-%, most preferably in the range from 5 to 60 wt.-%, such as in the range of 5 to 50 wt.-%, based on the total weight of the storage stable mixture (1-L).

The amount of the rice hulls and/or rice bran (total) in the storage stable mixture (1-L) is preferably at least 20 wt.-%, more preferably at least 30 wt.-%, most preferably at least 40 wt.-%, based on the total weight of the storage stable mixture (1-L). More preferably, the amount of the rice hulls and/or rice bran (total) in the storage stable mixture (1-L) is selected in the range from 20 to 95 wt.-%, most preferably in the range from 30 to 95 wt.-%, such as in the range of 40 to 95 wt.-%, based on the total weight of the storage stable mixture (1-L).

The amount of the edible solvent in the liquid formulation according to the present invention is preferably selected in the range of 50 to 99 wt.-%, more preferably in the range of 60 to 95 wt.-%, most preferably in the range of 70 to 90 wt.-%, such as in the range of 75 to 90 wt.-%, based on the total weight of the liquid formulation.

In a particular advantageous embodiment, the liquid formulation ($A_L$) consists essentially of (i) the compound of formula (I) and (ii) the edible solvent.

A very specific liquid formulation according to the present invention is a liquid formulation ($A_L$) which is a liquid formulation ($B_L$) consisting essentially of
    (i) 5 to 25 wt-%, based on the total weight of the liquid formulation, of propandiol mononitrate and
    (ii) At least 75 wt-%, based on the total weight of the powderous formulation, of propylene glycol or water, preferably propylene glycol.

The term 'liquid formulation consisting essentially of' indicates that the addition of all wt-% of the listed ingredients of the liquid formulations adds up to 100 wt.-% (i.e. the amount of the edible solvent is adjusted accordingly) with the proviso, however, that it cannot be excluded that small amount of impurities or water (moisture) may be present in the liquid formulations according to the present invention such as e.g. in amounts of less than 7 wt.-%, preferably less than 5 wt.-%, more preferably less than 3 wt.-%, which impurities/water (moisture) are e.g. introduced via the respective raw materials or processes used.

In another advantageous embodiment, the compound of formula (I) in the storage stable mixture (I) is used in the form of a powderous formulation comprising the compound of formula (I) and silica.

Thus, the present invention furthermore relates to a storage stable mixture (I) which is a storage stable mixture (1-S) comprising
(a1) a powderous formulation (A) comprising
    (i) a compound of formula (I)

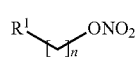

formula (I)

wherein
n is an integer from 1 to 15
$R^1$ is selected from the group consisting of H, $C_1$-$C_6$alkyl, phenyl, —OH, —$NH_2$, —CN, —COOH, —O(C=O)$R^8$, —NHC(=O)$R^8$, $SO_2NHR^8$, and —$ONO_2$, and
$R^8$ is $C_1$-$C_6$alkyl, phenyl, pyridyl such as preferably 2-pyridyl
with the proviso that when n is >3 the hydrocarbon chain may be interrupted by —O— or —NH—, and
    (ii) silica, and
(a2) rice hulls and/or rice bran.

The use of a powderous formulation instead of a liquid formulation further improves the retention of the compound of formula (I).

The amount of the powderous formulation (A) in the storage stable mixture (1-S) is preferably at least 1 wt.-%, more preferably at least 5 wt.-%, based on the total weight of the storage stable mixture (1-S). More preferably, the amount of the powderous formulation (A) in the storage stable mixture (1-S) is selected in the range from 1 to 85 wt.-%, most preferably in the range from 5 to 60 wt.-%, such as in the range of 5 to 50 wt-.%, based on the total weight of the storage stable mixture (1-S).

The amount of the rice hulls and/or rice bran (total) in the storage stable mixture (1-S) is preferably at least 10 wt-.%, more preferably at least 15 wt-.%, most preferably at least 20 wt.-%, based on the total weight of the storage stable mixture (1-S). More preferably, the amount of the rice hulls and/or rice bran (total) in the storage stable mixture (1-S) is selected in the range from 10 to 99 wt.-%, most preferably in the range from 15 to 95 wt.-%, such as in the range of 20 to 95 wt.-%, based on the total weight of the storage stable mixture (1-S).

The weight-ratio (w/w) of the rice hulls and/or rice bran (total) to the powderous formulation in the storage stable formulation (1-S) is preferably selected in the range of 50:1 to 1:10, preferably in the range of 50:1 to 1:5, more preferably in the range of 40:1 to 1:2, most preferably in the range of 30:1 to 1:1 or 20:1 to 1:1. Further advantageous ratios encompass 15:1 to 1:1 or 10:1 to 1:1.

The term 'powderous formulation' as used herein refers to solid formulations in powder form which freely flow (i.e. free flowing powders).

The amount of silica in the powderous formulations according to the present invention is generally selected in the range of 25 to 90 wt.-%, such as in the range of 30 to 90 wt.-%, 35 to 90 wt.-% or 40 to 90 wt.-%. Further preferred amounts encompass 60 to 85 wt.-% and 70 to 85 wt.-%.

In all embodiments of the present invention the powderous formulation (A) is preferably a powderous formulation (B) comprising
  (i) at least 0.1 wt-%, based on the total weight of the powderous formulation, of a compound of formula (I), and
  (ii) at least 25 wt-%, based on the total weight of the powderous formulation, of silica, and
  (iii) 0 to 40 wt-%, based on the total weight of the powderous formulation, of an edible oil.

The term 'edible oil' refers to oils commonly used in feed applications. Preferred edible oils to be used in the powderous formulations according to the present invention are propyleneglycol, canola oil, corn oil, rapeseed oil, sunflower oil, middle chain triglyceride (MCT), soy bean oil, water and glycerol as well as mixtures thereof. The most preferred edible oil to be used in the powderous formulation according to the present invention is propyleneglycol or water.

The powderous formulations according to the present invention may furthermore contain small amounts of customary additives commonly used in the preparation of powderous formulations for feed application.

Therefore, in a further embodiment the present invention relates to powderous formulations (B) which are powderous formulations (C) which further comprise (iv) 0 to 10 wt-%, based on the total weight of the formulation, of an additive.

The powderous formulation according to the present invention are generally prepared by a process wherein the compound of formula (I) is, optionally diluted in the edible oil and further optionally admixed with the additive(s), sprayed onto or admixed with a silica. Preferably, the powderous formulations according to the present invention are prepared by solubilizing the compound of formula (I) in the edible oil, preferably at ambient temperature (i.e. about 22° C.) or slightly elevated temperatures (up to 40° C.) before spraying onto or admixing the obtained solution with silica.

Alternatively, the powderous formulations according to the present invention can be prepared by a process wherein the compound of formula (I) is, optionally in the presence of the edible oil and further optionally admixed with the additive(s), diluted respectively solubilized in an organic solvent suitable for the preparation of feed products such as e.g. dichloromethane which dilution is then sprayed onto or admixed with silica followed by evaporation of the organic solvent.

In a particular advantageous embodiment, the powderous formulations according to the present invention are adsorbates.

For the purposes of the present invention, adsorbates are, in particular, preparations in which at least 10 wt.-%, in particular at least 20 wt.-%, preferably at least 30 wt.-%, particularly preferably at least 40 wt.-%, in particular at least 50 wt.-% of the components to be adsorbed (i.e. all constituents of the adsorbate without the silica, i.e. the compound(s) of formula (I), and optionally the edible oil and the additives) are present in the internal pore volume of the silica. The internal pore volume of a carrier can be determined as void volume by the DPB (dibutyl phthalate) method DIN 53601.

Particular preference is given to adsorbates of which at least 60 wt.-%, preferably at least 70 wt.-%, in particular at least 80 wt.-%, is present in the internal pore volume of the silica.

Silica is a well-known carrier material in the feed and food industry and refers to white microspheres of amorphous silica (also referred to as silicone dioxide) and is available in a great variety of particle sizes. Particular suitable silica to be used in powderous formulations according to the present invention is amorphous precipitated silica e.g. available as Ibersil D-250 at IQE Group, Sipernat 2200 at Evonik or Tixosil 68 at Solvay, Zeofree 5170 from J.M. Huber Cooperation or Newsil C50 from Quechen Silicon Chemical Co Ltd.

Preferably the silica which is used in powderous formulations according to the present invention has an average particle size D(v, 0.5)>200 µm. More preferably the particle size of the silica is selected in the range of 200 µm to 400 µm, most preferably in the range of 250 µm to 380 µm, even more preferably in the range of 300 to 360 µm.

The particle sizes as given herein are measured by a Malvern Master Sizer 2000 following the recommendations outlined in ISO13320-1 for particle size analysis via laser diffraction methods (laser diffraction light scattering). During this laser diffraction measurement, particles are passed through a focused laser beam. The particles scatter light at an angle that is inversely proportional to their size. The angular intensity of the scattered light is then measured by a series of photosensitive detectors. The map of scattering intensity versus angle is the primary source of information used to calculate the particle size. For the measurement of the silica according to the present invention a dry powder feeder (Malvern Scirocco) was used.

Advantageously, the silica which is used in the powderous formulations according to the present invention furthermore exhibits a pH in the range of pH 6 to 8.5 (measured as a 1% suspension in distilled water), such as preferably in the range of pH 7 to 8.

The term 'additive' as used herein refers to additives commonly used in the preparation of powderous formulations for feed application. Preferred additives to be used in the powderous formulations according to the present invention are thickeners, such as in particular gums or cellulose derivatives such as xanthan gum, karaya gum and/or ethylcellulose.

Particular advantageous powderous formulations according to the present invention are powderous formulation (A) which are powderous formulations (D) consisting essentially of
(i) 1 to 25 wt-%, based on the total weight of the powderous formulation, of a compound of formula (I), and
(ii) at least 20 wt-%, based on the total weight of the powderous formulation, of silica, and
(iii) 5 to 45 wt-%, based on the total weight of the formulation, of edible oil, and
(iv) 0 to 10 wt-%, based on the total weight of the powderous formulation, of an additive.

Even more advantageous powderous formulations according to the present invention are powderous formulations (A) which are powderous formulations (E) consisting essentially of
(i) 2 to 20 wt-%, based on the total weight of the powderous formulation, of a compound of formula (I), and
(ii) at least 25 wt-%, based on the total weight of the powderous formulation, of silica, and
(iii) 10 to 45 wt-%, based on the total weight of the powderous formulation, of an edible oil, and
(iv) 0 to 10 wt-%, based on the total weight of the powderous formulation, of an additive.

An especially preferred powderous formulation according to the present invention is a powderous formulation (A) which is a powderous formulations (F) consisting essentially of
(i) 2 to 15 wt-%, based on the total weight of the powderous formulation, of a compound of formula (I), and
(ii) at least 40 wt-%, based on the total weight of the powderous formulation, of silica, and
(iii) 20 to 40 wt-%, based on the total weight of the powderous formulation, of an edible oil, and
(iv) 0 to 5 wt-%, based on the total weight of the powderous formulation, of an additive.

In all embodiments of the present invention, the compounds of formula (I) preferably have a boiling point below 250° C. at 760 Torr, preferably a boiling point in the range of 100 and 200° C. at 760 Torr.

The compounds of formula (I) are known and either commercially available or can be prepared in analogy to the processes as e.g. disclosed in WO2012/084629.

Particular advantageous compounds of formula (I) to be used in the powderous formulations according to the present invention are the compounds wherein n is an integer between 3 and 9 and $R^1$ is OH, COOH or $-ONO_2$ and with the proviso that if n is 4 the hydrocarbon chain may be interrupted by $-NH-$ such as in particular the compounds of formula $R^1-(CH_2)_2-NH-(CH_2)_2-ONO_2$. Even more preferred are compounds of formula (I) wherein n is an integer between 3 and 9 and $R^1$ is OH, COOH or $-ONO_2$.

Even more advantageous compounds of formula (I) to be used in the powderous formulations according to the present invention are propandiol mononitrate (CAS-No: 100502-66-7), 9-nitrooxynonanol, 5-nitroxy pentanoic acid (CAS 74754-56-6), 6-nitroxy hexanoic acid (CAS 74754-55-5), bis(2-hydroxyethyl)amine dinitrate (CAS 20830-49-3), 1,4-bis-nitrooxybutane (CAS 3457-91-8) and 1,5-bis-nitrooxypentane (CAS 3457-92-9). The most preferred compound of formula (I) to be used in the powderous formulations according to the present invention is propandiol mononitrate.

A very specific powderous formulation according to the present invention is a powderous formulation (A) which is a powderous formulations (G) consisting essentially of
(i) 2 to 15 wt-%, based on the total weight of the powderous formulation, of propandiol mononitrate, and
(ii) at least 45 wt-%, based on the total weight of the powderous formulation, of silica, and
(iii) 20 to 40 wt-%, based on the total weight of the powderous formulation, of propyleneglycol.

The term 'powderous formulation consisting essentially of' indicates that the addition of all wt-% of the listed ingredients of the powderous formulations adds up to 100 wt.-% (i.e. the amount of silica is adjusted accordingly) with the proviso, however, that it cannot be excluded that small amount of impurities or water (moisture) may be present in the powderous formulations according to the present invention such as e.g. in amounts of less than 7 wt.-%, preferably less than 5 wt.-%, more preferably less than 3 wt.-%, which impurities/water (moisture) are introduced via the respective raw materials or processes used and which are not added separately.

The powderous formulations (A) to (G) with all the preferences and definitions as given herein can additionally be coated with customary coatings in the art such as wax or fats. If present, such coating is generally applied in amounts of 5 to 50 wt.-% based on the total weight of the powderous form. Advantageously, the coating comprises wax and/or fat, which has a dropping point (Tropfpunkt) of from 30 to 85° C.

The dropping point of a material as used herein refers to the temperature (in ° C.) when the material begins to melt under standardized conditions. Thus, the material is heated so long until it changes the state of matter from solid to liquid. The dropping point is the temperature when the first dropping is released from the material. The determination of the dropping point is carried out as described in the standard norm DIN ISO 2176.

Particularly suitable waxes to be used as coating in the context of the present invention include organic compounds consisting of long alkyl chains, natural waxes (plant, animal) which are typically esters of fatty acids and long chain alcohols as well as synthetic waxes, which are long-chain hydrocarbons lacking functional groups.

Particularly suitable fats to be used as coating in the context of the present invention include a wide group of compounds which are soluble in organic solvents and largely insoluble in water such as hydrogenated fats (or saturated fats) which are generally triesters of glycerol and fatty acids. Suitable fats can have natural or synthetic origin. It is possible to hydrogenate a (poly)unsaturated fat to obtain a hydrogenated (saturated) fat.

Preferred examples of waxes and fats to be used as coating according to the present invention are glycerine monostearate, carnauba wax, candelilla wax, sugarcane wax, palmitic acid, stearic acid hydrogenated cottonseed oil, hydrogenated palm oil and hydrogenated rapeseed oil as well as mixtures thereof.

In a preferred embodiment, the powderous formulations (A) to (G) with all the preferences and definitions as given herein are not coated.

The term 'rice hulls and/or rice bran' according to the present invention refers to the outer covering of the rice. Rice Bran is a by-product obtained from the rice milling process. It is especially obtained during the conversion of brown rice to white rice. Rice hulls (Rice husks) refers to the grain's hard protecting cover which are obtainable during the milling process were the hulls are removed from the raw grain and can also be used as rice hulls flour or powder. Both, rice hulls and rice bran can be obtained from rice mills.

It is well understood, that the storage stable mixtures (I), (1-L) and (1-S) according to the present invention and with all the definitions and preferences as given herein, may contain additional active and/or feed ingredients and/or edible oils conventionally used in the feed industry and/or in feed products.

Thus, in one further embodiment, the present invention relates to a storage stable mixture (I) with all the definitions and preferences as given herein which is a storage stable mixture (II) further comprising at least one active ingredient and/or feed ingredient and/or edible oil.

In further embodiment, the present invention relates to a storage stable mixture (1-L) with all the definitions and preferences as given herein which is a storage stable mixture (2-L) further comprising (b3) at least one active ingredient and/or feed ingredient and/or (b4) edible oil.

In another further embodiment, the present invention relates to a storage stable mixture (1-S) with all the definitions and preferences as given herein which is a storage stable mixture (2-S) further comprising (a3) at least one active ingredient and/or feed ingredient and/or (a4) edible oil.

In a particular advantageous embodiment, the storage stable mixture (1-S) is a storage stable mixture (3-S) comprising
  (a1) a powderous formulation (A), (B), (C), (D), (E), (F) or (G), and
  (a2) rice hulls and/or rice bran, and
  (a3) active ingredient and/or feed ingredient, and optionally
  (a4) edible oil.

In a particular preferred embodiment, the active ingredient is selected from the group consisting of water-soluble and/or fat-soluble vitamins, trace and/or macro minerals, amino acids as well as mixtures thereof.

Particularly suitable fat-soluble vitamins according to the present invention encompass vitamin A, vitamin D3, vitamin E, and vitamin K, e.g. vitamin K3. Particularly suitable water-soluble vitamins encompass vitamin B12, biotin and choline, vitamin B1, vitamin B2, vitamin B6, niacin, folic acid and panthothenate, e.g. Ca-D-panthothenate as well as mixtures thereof.

Particularly suitable trace minerals according to the present invention encompass manganese (e.g. in the form of manganese oxide), zinc (e.g. in the form of zinc oxide), iron (e.g. in the form of iron sulphate), copper (e.g. in the form of copper sulphate), iodine (e.g. in the form of sodium iodine), selenium, and cobalt as well as mixtures thereof.

Particularly suitable macro minerals according to the present invention encompass calcium (e.g. in the form of limestone and calcium (mono, di or triphosphate), magnesium, phosphorus and sodium (e.g. in the form of sodium chloride) as well as mixtures thereof.

In a particular preferred embodiment, the at least one feed ingredient is selected from the group consisting of roughage and concentrates as well as mixtures thereof.

In one particular advantageous embodiment according to the present invention, the storage stable mixture (1-S) according to the present invention is a premix (1A) consisting essentially of the ingredients (a1) and (a2).

In a further preferred embodiment, the storage stable mixture (1-S) is a premix (1B) consisting essentially of
  (a1) at least 5 wt.-%, preferably from 5 to 85 wt.-%, most preferably from 5 to 60 wt.-%, based on the total weight of the premix, of a powderous formulation (A), (B), (C), (D), (E), (F) or (G), and
  (a2) at least 10 wt.-%, preferably from of 15 to 95 wt.-%, most preferably from 40 to 95 wt.-%, based on the total weight of the premix, of rice hulls and/or rice bran.

In another preferred embodiment, the storage stable mixture (2-S) according to the present invention is a premix (2A) consisting essentially of (a1) to (a3) and optionally (a4) and wherein (a3) is additional active ingredient selected from the group consisting of water-soluble and/or fat-soluble vitamins, trace and/or macro minerals, amino acids as well as mixtures thereof with the proviso that the ingredients (a1) to (a4) sum up to 100 wt.-% t.

In a further preferred embodiment, the storage stable mixture (2-S) is a premix (2B) consisting essentially of
  (a1) at least 5 wt-.%, preferably from 5 to 20 wt.-%, most preferably from 10 to 15 wt.-%, based on the total weight of the premix, of a powderous formulation (A), (B), (C), (D), (E), (F) or (G), and
  (a2) at least 10 wt.-%, preferably from of 15 to 70 wt.-%, most preferably from 20 to 50 wt.-%, based on the total weight of the premix, of rice hulls and/or rice bran, and
  (a3) at least 5 wt.-%, preferably, from 20 to 80 wt.-%, most preferably from 40 to 70 wt-%, based on the total weight of the premix, of active ingredient selected from the group of water-soluble and/or fat-soluble vitamins, trace and/or macro minerals, amino acids as well as mixtures thereof, and
  (a4) 0 to 15 wt.-%, preferably 0 to 10 wt-.%, most preferably 0 to 5 wt-.%, based on the total weight of the premix, of edible oil.

It is noted that next to all the preferences given herein, particular preferred edible oils to be used in the storage stable mixtures according to the present invention are corn oil, rapeseed oil, sunflower oil, canola oil and or soy bean oil as well as mixtures thereof, such as most preferably soy bean oil.

The term 'premix' as used herein designates a preferably uniform mixture of the listed ingredients which are generally used to facilitate uniform dispersion of active ingredients into a larger mix.

The term 'premix consisting essentially of' indicates that the addition of all wt-% of the listed ingredients of the premix adds up to 100 wt.-% with the proviso, however, that it cannot be excluded that small amount of impurities or water (moisture) may be present in the powderous formulations according to the present invention such as e.g. in amounts of less than 7 wt.-%, preferably less than 5 wt.-%, more preferably less than 3 wt.-%, which impurities/water (moisture) are introduced via the respective raw materials or processes used and which are not added separately.

All the above disclosed premixes can be used as such or admixed to feed products.

Additionally, all the above disclosed premixes can be used in the production of feed products.

It is well understood, that the storage stable mixture (1) according to the present invention may also be a feed product.

Thus, in another preferred embodiment, the storage stable mixture (2-S) according to the present invention is a feed product (2a) consisting essentially of (a1) to (a3) and optionally (a4) and wherein (a3) is (a3/1) at least one additional active ingredient selected from the group consisting of water-soluble and/or fat-soluble vitamins, trace and/or macro minerals, amino acids as well as mixtures thereof and (a3/2) at least one feed ingredient selected from the group of roughage and concentrate.

In a further preferred embodiment, the storage stable mixture (2-S) is a feed product (2b) consisting essentially of
- (a1) at least 0.001 wt.-%, preferably from 0.001 to 10 wt.-%, most preferably from 0.001 to 5 wt.-%, based on the total weight of the feed product, of a powderous formulation (A), (B), (C), (D), (E), (F) or (G), and
- (a2) at least 1 wt.-%, preferably from of 1 to 20 wt.-%, most preferably from 1 to 10 wt.-%, based on the total weight of the feed product, of rice hulls and/or rice bran, and
- (a3/1) at least 0.1 wt.-%, preferably from 0.5 to 20 wt.-%, most preferably from 0.5 to 10 wt-%, based on the total weight of the feed product, of at least one active ingredient selected from the group of water-soluble and/or fat-soluble vitamins, trace and/or macro minerals, amino acids as well as mixtures thereof, and
- (a3/2) at least 5 wt.-%, preferably from 10 to 95 wt.-%, preferably from 20 to 90 wt-%, based on the total weight of the feed product, of at least one feed ingredient selected from the group of roughage and concentrate as well as mixtures thereof, and
- (a4) 0 to 15 wt-.%, preferably 0 to 10 wt-.%, most preferably 0 to 5 wt.-%, based on the total weight of the feed product, of at least one edible oil.

The term roughage (also known as forage) and concentrate are well known to a person skilled in the art. Roughage is primarily composed of cellulosic materials such as plant stems and leaves, e.g. hay, introduced grass, native grass, green roughage, straw, tree leaves, etc.; as well as crude fibers such as e.g. brewery's by-products. The concentrates are generally comprised of the conventional components such as mainly proteins, starch and fats. The concentrate components thus include, for example cereals such as corn, wheat, barley, rye, oat, wheat flour etc.; oil meals such as soybean meal, sunflower oil meal, etc.; feeds of animal origin such as fish meal, mead-and-bone meal, animal oils (e.g. beef oil, lard oil, bone oil, etc.) without being limited thereto.

In a further embodiment the invention also concerns to the use of a rice hulls and/or rice bran to enhance the retention of a compound of formula (I) according to the present invention and with all the definitions and preferences as given herein.

In another further embodiment the invention also concerns to the use of a rice hulls and/or rice bran to enhance the retention of a compound of formula (I)

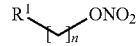

formula (I)

wherein
n is an integer from 1 to 15
$R^1$ is selected from the group consisting of H, $C_1$-$C_6$alkyl, phenyl, —OH, —$NH_2$, —CN, —COOH, —O(C=O)$R^8$, —NHC(=O)$R^8$, $SO_2NHR^8$, and —$ONO_2$, and
$R^8$ is $C_1$-$C_6$alkyl, phenyl, pyridyl such as preferably 2-pyridyl
  with the proviso that when n is >3 the hydrocarbon chain may be interrupted by —O— or —NH—
in a powderous formulation comprising
  (i) the compound according to formula (I), and
  (ii) silica.

Thus, the invention also relates to the use of a rice hulls and/or rice bran to enhance the retention (i.e. reduce the evaporation) of a compound of formula (I) in a powderous formulation according to the present invention such as in particular in the powderous formulations (A), (B), (C), (D), (E), (F) or (G). Preferably, the retention is at least 70%, preferably at least 80% most preferably at least 90% such as in particular at least 95%.

In another embodiment, the present invention relates to a method of improving the retention (i.e. reducing the evaporation) of a compound of formula (I), said method comprising admixing the compound of formula (I) with a rice hulls and/or rice bran. It is preferred that the weight-ratio (w/w) of the rice hulls and/or rice bran to the compound of formula (I) is at least 1, preferably at least 5, more preferably at least 10, most preferably at least 25 such as at least 50 as already stated above. Even more preferably the weight-ratio (w/w) of the rice hulls and/or the rice bran to the compound of formula (I) is selected in the range of 200:1 to 1:1 (i.e. 200 part of rice hulls and/or rice bran to 1 part of a compound of formula (I) to 1 parts of rice hulls and/or rice bran to 1 part of a compound of formula (I)), more preferably in the range of 150:1 to 5:1, most preferably in the range of 100:1 to 25:1. Further suitable ranges are 100:1 to 10:1, 100:1 to 15:1, 100:1 to 30:1 or 100:1 to 35:1.

The invention furthermore concerns a method of improving the retention of a compound of formula (I)

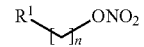

formula (I)

wherein
n is an integer from 1 to 15
$R^1$ is selected from the group consisting of H, $C_1$-$C_6$alkyl, phenyl, —OH, —$NH_2$, —CN, —COOH, —O(C=O)$R^8$, —NHC(=O)$R^8$, $SO_2NHR^8$, and —$ONO_2$, and
$R^8$ is $C_1$-$C_6$alkyl, phenyl, pyridyl such as preferably 2-pyridyl
  with the proviso that when n is >3 the hydrocarbon chain may be interrupted by —O— or —NH—
in a powderous formulation comprising
  (i) the compound according to formula (I), and
  (ii) silica,
said method comprising admixing the powderous formulation with a rice hulls and/or rice bran.

Thus, in another embodiment, the present invention relates to a method of improving the retention (i.e. reducing the evaporation) of a compound of formula (I) in a powderous formulation according to the present invention such as in particular a powderous formulation (A), (B), (C), (D), (E), (F) or (G), said method comprising admixing the powderous formulation with a rice hulls and/or rice bran. In a preferred embodiment, the weight-ratio (w/w) of the rice hulls and/or rice bran (total) to the powderous formulation is selected in the range of 50:1 to 1:5, preferably in the range of 40:1 to 1:2, most preferably in the range of 30:1 to 1:1 or 20:1 to 1:1, as these formulations are particular suitable to effectively retain the compound of formula (I) over storage.

In another embodiment, the present invention relates to a method of improving the retention (i.e. reducing the evaporation) of a compound of formula (I) according to the present invention, said method comprising the step of preparing a mixture or a premix according to the present invention with all the definitions and preferences as given herein. Preferably, the mixture exhibits a retention of at least 80%, preferably at least 85% most preferably at least 90% such as in particular at least 95%.

In another embodiment, the present invention relates to a method of improving the retention (i.e. reducing the evaporation) of a compound of formula (I) in a powderous formulation according to the present invention such as in particular in the powderous formulations (A), (B), (C), (D), (E), (F) or (G), said method comprising the step of preparing a mixture or a premix according to the present invention with all the definitions and preferences as given herein. Preferably, the mixture/premix exhibits a retention of at least 80%, preferably at least 85% most preferably at least 90% such as in particular at least 95%.

The term 'retention' as used therein refers to a retention of the compound of formula (I) with all the definitions and preferences as given herein over a storage time of at least 4 weeks (reclosed (i.e. a bag which has been rolled twice for closure and then fixated with a clip) PE or aluminium bag; 25° C.; 50% relative humidity (r.H.)).

In a further advantageous embodiment, the invention relates to a method to enhance the retention of a compound of formula (I) according to the present invention and with all the definitions and preferences as given herein in a feed product, said method comprising the step of adding a mixture according to the present invention with all the definitions and preferences as given herein with/to the feed product.

In a further advantageous embodiment, the invention relates to a method to enhance the retention of a compound of formula (I) in a powderous formulation according to the present invention and with all the definitions and preferences as given herein in a feed product, said method comprising the step of adding a mixture according to the present invention with all the definitions and preferences as given herein with/to the feed product.

In a further embodiment, the invention relates to a method to enhance the storage stability of a feed product comprising a compound of formula (I) respectively a powderous formulation according to the present invention such as in particular the powderous formulations (A), (B), (C), (D), (E), (F) or (G), said method comprising the step of adding rice hulls and/or rice bran to the feed composition. Preferably, the weight-ratio (w/w) of the rice hulls and/or rice bran (total) to the powderous formulation is selected in the range of 50:1 to 1:5, preferably in the range of 40:1 to 1:2, most preferably in the range of 30:1 to 1:1 or 20:1 to 1:1, as these formulations are particular suitable to effectively retain the compound of formula (I) during storage.

Advantageously in all methods and uses according to the present invention the weight-ratio (w/w) of the rice hulls and/or rice bran to the compound of formula (I) is at least 1, preferably at least 5, more preferably at least 10, most preferably at least 25. Even more advantageously the weight-ratio (w/w) of the rice hulls and/or rice bran (total) to the compound of formula (I) is selected in the range of 200:1 to 1:1 (i.e. 200 part of rice hulls and/or rice bran to 1 part of a compound of formula (I) to 1 parts of rice hulls and/or rice bran to 1 part of a compound of formula (I)), more preferably in the range of 150:1 to 5:1, most preferably in the range of 100:1 to 25:1 such as 100:1 to 30:1 or to 100:1 to 35:1.

Furthermore, it is preferred that in all uses and methods according to the present invention the retention after at least 4 weeks is at least 80%, preferably at least 85% most preferably at least 90% such as in particular at least 95%.

Preferably, the amount of the mixture according to the present invention in the feed product is selected such, that the amount of the compound of formula (I) is in the range of 0.01 to 50 g/kg of feed product, preferably in the range of 0.02 to 25 g/kg of feed product, most preferably in the range of 1 to 10 g/kg of feed product.

The term feed product refers in particular to ruminant feed compositions as well as to feed additives.

It is well understood that all the definitions and preferences of the rice hulls and/or rice brans, powderous formulations, compounds of formula (I), active and/or feed ingredients and edible oils etc. as given herein also apply to the mixtures, premixes, feed products, uses and methods according to the present invention as outlined above.

The invention is illustrated by the following Examples. All temperatures are given in ° C. and all parts and percentages are related to weight.

EXAMPLES

General Information

A.) HPLC Method

Agilent High Performance Liquid Chromatography 1260 Infinity system, using an Aquasil C18, 150×3 mm, 3 μm column and detecting at 210 nm. The column oven was set to 23° C., the autosampler not temperature controlled. The mobile phase consisted of mobile phase A (940 mL Milli-Q-water+60 ml acetonitrile+1 mL methane sulfonic acid) and mobile phase B (800 ml Milli-Q-water+200 ml acetonitrile+1 mL methane sulfonic acid) which were used in gradient mode (0 min: 0% B, 15 min: 0% B, 15.5 min: 100% B, 21 min: 100% B, 21.5 min: 0% B, 25 min: 0% B (=end of run)) with a flow of 0.4 ml/min.

B.) Powderous Formulation Comprising Propandiol Mononitrate (PF-PDMN)

To 80 g of silica (Newsil C50) placed on a beaker, are added 80 g of a 20 wt.-% propandiol mononitrate (PDMN) solution in propyleneglycol under gentle agitation at room temperature. After 5 minutes agitation, the adsorption is completed and a free-flowing powder is obtained.

C.) Liquid formulation comprising propandiol mononitrate in propyleneglycol (PG-PDMN) 20 g of propandiol mononitrate and 80 g of propyleneglycol are mixed under gentle agitation until a clear solution is obtained.

Example 1: Retention of PDMN in PF-PDMN Admixed with Different Organic Carriers 10 g of PF-PDMN and 90 g of an organic carrier as outlined in table 1 have been mixed with a TURBULA® Shaker-Mixer (64 rotations/min) for 10 min, sieved through a 2 mm sieve and mixed again for 10 min to obtain homogenous mixtures (100 g batches). Then 10 g of the respective mixtures were stored in reclosed PE bags at 25° C. under controlled atmosphere (50% r.H) for 1 month. Afterwards the remaining content of PDMN was determined by HPLC. The results (as relative concentration to the initial value set to 100%) are presented Table 1.

TABLE 1

Retention of PDMN in PF-PDMN in dependence of various organic carriers

| # | Organic carrier | Retention [%] |
|---|---|---|
| Inv 1 | Rice Hulls | 89 |
| Ref 1 | Modified starch* | 48 |

*starch sodium octenyl succinate ("OSA-starch").

As can be retrieved from table 1, the use of the rice hulls according to the present invention resulted in an improved retention of the active compared to other organic carriers commonly used in the feed industry.

Example 2: Retention of PDMN in a Premix Comprising Different Carriers

In a comparative trial, 80 g of a mineral premix consisting of vitamins (Rovimix AD3 1000/200 (0.1 wt.-%) & Rovimix E 50 Ads (1 wt.-%)), minerals (92.9 wt.-%) and PF-PDMN (6 wt.-%) was admixed with 20 g of either rice bran or diatomaceous earth (Kieselgur) and then stored for 3 months in reclosed PE bags at 25° C. under controlled atmosphere (50% r.H). Afterwards the remaining content of PDMN was determined by HPLC. The results (as relative concentration to the initial value set to 100%) are presented Table 2.

TABLE 2

Retention of PDMN in a premix comprising different carriers

| # | Mineral premix | Inorganic carrier | Retention |
|---|---|---|---|
| Inv 2 | 80 wt.-% | Rice bran 20 wt.-% | 71% |
| Ref 2 | 80 wt.-% | Diatomaceous earth (Kieselgur) 20 wt.-% | 66% |

As can be seen the addition of rice bran to the mineral premix containing PF-PDMN results in a significantly better retention of PDMN compared to another carrier commonly used in the feed industry.

Example 3: Retention of PDMN in PF-PDMN Admixed with Rice Hulls in Different Ratios PF-PDMN and rice hulls in the weight-ratios as outlined in table 3 have been mixed with a TURBULA® Shaker-Mixer (64 rotations/min) for 10 min, sieved through a 2 mm sieve and mixed again for 10 min to obtain homogenous mixtures (50 g batches). Then two samples (5 g each) were stored in reclosed PE bags at 25° C. under controlled atmosphere (60% r.H) for 2 months. Afterwards the remaining content of PDMN was determined by HPLC. The results (as relative concentration to the initial value set to 100%) are presented Table 3.

TABLE 3

Retention of PDMN in PF-PDMN admixed with rice hulls in different ratios

| # | Ratio [%] | Retention [%] |
|---|---|---|
| Inv 3 | 90/10 | 98 |
| Inv 4 | 50/50 | 92 |
| Inv-5 | 30/70 | 98 |

As can be retrieved from table 3, the use of the rice hulls according to the present invention resulted in an improved retention of the active over a broad concentration range.

Example 4: Retention of PDMN in PG-PDMN Admixed with Rice Hulls in Different Ratios Rice hulls were weighted into a PE bag. Then the corresponding amount of a solution of 20 wt.-% of PDMN in propyleneglycol (as outlined in table 4) was sprayed into the bag with a compressed air gun at 0.5 bar pressure (50 g batches). Afterwards the bag was closed and mixed manually. Then the rice hull/PG-PDMN mixture was transferred into a 400 ml flask and mixed with a TURBULA® Shaker-Mixer (64 rotations/min) for 10 min to obtain a homogeneous mixture. Then two samples (5 g each) of the respective mixtures were stored in reclosed PE bags at 25° C. under controlled atmosphere (60% r.H) for 2 months. Afterwards the remaining content of PDMN was determined by HPLC. The results (as relative concentration to the initial value set to 100%) are presented Table 4.

TABLE 4

Retention of PDMN in PG-PDMN admixed with rice hulls in different ratios

| # | Ratio [%] | Retention [%] |
|---|---|---|
| Inv 6 | 10/90 | 92 |
| Inv 7 | 30/70 | 93 |
| Inv-8 | 50/50 | 93 |

As can be retrieved from table 4, the use of the rice hulls according to the present invention resulted also in a significant improvement of the retention in the absence of a silica carrier over a broad concentration range.

The invention claimed is:

1. A storage stable mixture comprising:
   (a) a powderous formulation; and
   (b) rice hulls and/or rice bran;
   wherein the powderous formulation comprises:
      (i) silica, and
      (ii) 1,3-propanediol mononitrate (PDMN) as an active ingredient absorbed on the silica; and
   wherein the rice hulls and/or rice bran are present in an amount to provide a weight ratio (w/w) of the rice hulls and/or rice bran to the PDMN active ingredient of 200:1 to 1:1 sufficient to reduce evaporation and thereby provide a retention of the PDMN active ingredient in the powderous formulation which is at least 70% when stored in a closed polyethylene or aluminum bag for at least 4 weeks at 25° C. and 50% relative humidity.

2. The storage stable mixture according to claim 1, wherein the mixture comprises a weight ratio of the rice hulls and/or rice bran to the powderous formulation in a range of 50:1 to 1:5.

3. The storage stable mixture according to claim 2, wherein the weight ratio of the rice hulls and/or rice bran to the powderous formulation is in a range of 40:1 to 1:2.

4. The storage stable mixture according to claim 2, wherein the weight ratio of the rice hulls and/or rice bran to the powderous formulation is in a range of 30:1 to 1:1.

5. The storage stable mixture according to claim 2, wherein the weight ratio of the rice hulls and/or rice bran to the powderous formulation is in a range of 20:1 to 1:1.

6. The storage stable mixture according to claim 1, wherein the powderous formulation consists essentially of:
- 2 to 20 wt. %, based on the total weight of the powderous formulation, of the PDMN active ingredient,
- at least 25 wt. %, based on the total weight of the powderous formulation, of the silica,
- 10 wt. % to 45 wt. %, based on the total weight of the powderous formulation, of an edible oil, and
- 0 to 10 wt. %, based on the total weight of the powderous formulation, of an additive.

7. The storage stable mixture according to claim 6, wherein the edible oil is selected from the group consisting of propyleneglycol, canola oil, corn oil, rapeseed oil, sunflower oil, middle chain triglyceride (MCT), glycerol and mixtures thereof.

8. The storage stable mixture according to claim 1, wherein the powderous formulation consists essentially of:
- 2 to 15 wt. %, based on the total weight of the powderous formulation, of the PDMN active ingredient,
- at least 45 wt. %, based on the total weight of the powderous formulation, of the silica, and
- 20 to 40 wt. %, based on the total weight of the powderous formulation, of propyleneglycol.

9. The storage stable mixture according to claim 1, wherein the mixture is a premix consisting essentially of ingredients (a) and (b).

10. The storage stable mixture according to claim 1, wherein the mixture is a premix further comprising:
- (c) an active ingredient selected from the group consisting of water-soluble and/or fat-soluble vitamins, trace and/or macro minerals, amino acids and mixtures thereof, and optionally
- (d) an edible oil,
with a proviso that ingredients (a) to (d) are present in amounts that sum up to 100 wt. %.

11. The storage stable mixture according to claim 1, wherein the mixture is a feed product further comprising:
- (c) an active ingredient selected from the group consisting of water-soluble and/or fat-soluble vitamins, trace and/or macro minerals, amino acids and mixtures thereof, and
- (d) a feed ingredient selected from the group consisting of roughage and concentrates, and optionally
- (e) an edible oil.

12. The storage stable mixture according to claim 1, wherein the ratio (w/w) of the rice hulls and/or the rice bran to the PDMN active ingredient is at least 5:1.

13. The storage stable mixture according to claim 1, wherein the ratio (w/w) of the rice hulls and/or the rice bran to the PDMN active ingredient is at least 10:1.

14. The storage stable mixture according to claim 1, wherein the ratio (w/w) of the rice hulls and/or the rice bran to the PDMN active ingredient is at least 25:1.

15. A method of improving retention of propanediol mononitrate in a powderous formulation comprising the propanediol mononitrate, the method comprising the steps of:
- (a) providing a powderous formulation comprising silica and 1,3-propanediol mononitrate (PDMN) as an active ingredient absorbed on the silica, and
- (b) admixing the powderous formulation comprising the silica and PDMN active ingredient absorbed on the silica with rice hulls and/or rice bran in amounts so as to achieve a weight ratio (w/w) of the rice hulls and/or the rice bran to the powderous formulation in a range of 50:1 to 1:10 and to achieve a weight ratio (w/w) of the rice hulls and/or rice bran to the PDMN active ingredient of 200:1 to 1:1 sufficient to reduce evaporation and thereby provide a retention of the PDMN active ingredient in the powderous formulation which is at least 70% when stored in a closed polyethylene or aluminum bag for at least 4 weeks at 25° C. and 50% relative humidity.

16. The method according to claim 15, wherein the ratio (w/w) of the rice hulls and/or the rice bran to the PDMN active ingredient is at least 5:1.

17. The method according to claim 15, wherein the ratio (w/w) of the rice hulls and/or the rice bran to the PDMN active ingredient is at least 10:1.

18. The method according to claim 15, wherein the ratio (w/w) of the rice hulls and/or the rice bran to the PDMN active ingredient is at least 25:1.

19. The method according to claim 15, wherein the retention of the PDMN active ingredient is at least 80% when stored in a closed polyethylene or aluminum bag for at least 4 weeks at 25° C. and 50% relative humidity.

20. The method according to claim 15, wherein the retention of the PDMN active ingredient is at least 90% when stored in a closed polyethylene or aluminum bag for at least 4 weeks at 25° C. and 50% relative humidity.

21. The method according to claim 15, wherein the retention of the PDMN active ingredient is at least 95% when stored in a closed polyethylene or aluminum bag for at least 4 weeks at 25° C. and 50% relative humidity.

* * * * *